United States Patent Office 3,697,250
Patented Oct. 10, 1972

3,697,250
METHOD OF DESUCKERING TOBACCO PLANTS
David W. Young, Homewood, and Jerry A. Dieter, Park Forest, Ill., assignors to Atlantic Richfield Company, New York, N.Y.
No Drawing. Filed Dec. 3, 1969, Ser. No. 881,910
Int. Cl. A01n
U.S. Cl. 71—78                                9 Claims

ABSTRACT OF THE DISCLOSURE

A method of improving plant health by applying horticultural chemicals is disclosed. The horticulturally-active compounds are esters of styrene-maleic anhydride copolymers and both of a lower alkoxy polyethylene glycol and an alkanol containing about 8 to 24 carbon atoms. The method is useful, for instance, for combatting tobacco sucker formations.

---

This invention relates to an improved method of improving plant health utilizing horticulturally-active compounds. More particularly, the invention concerns the use of mixed esters of lower alkoxy polyethylene glycols and alkanols of about 8 to 24 carbon atoms, with polymers of styrene and maleic anhydride as horticultural chemicals such as plant growth regulants.

Numerous pesticidal, fungicidal and growth-regulating chemicals used in plant crop production are preferably employed in aqueous media. Dilution is nearly always necessary for application of the agents in realistic dosages and is often required in order to achieve uniform application of these chemicals. The preference of water as a diluent obviously stems from its non-deleterious, if not always beneficial, effects on plant life and from simple economic reasons as well. Due to the fact that these agents frequently exhibit limited, if any, solubility in water, however, they are usually dispersed in the aqueous vehicle with the aid of a suitable surface-active agent, resulting in the formation of a semi-stable or stable emulsion. Various non-ionic, cationic and anionic surface-active agents have been employed for the preparation of such water-based horticultural chemicals including, for example, block copolymers of ethylene oxide and propylene oxide (such as the commercially available material Pluronic L61), nonyl phenol polyethyleneoxide (such as the commercially available material Lissapol N), alkali metal salts of stearic acid, polyethyleneoxide esters of stearic acid (as, for example, the commercially available material Ethofat 60/15), polyoxyethylene sorbitan monolaurate (commercially available as Tween-20), polyoxyethylene sorbitan monoleate (commercially available as Tween-80), mixtures of alkyl aryl sulfonates and polyoxyethylene sorbitan esters of fatty acids (such as Altox G–2018), etc. More than simply effecting a dispersion, suspension of emulsion of the selected chemicals in the aqueous vehicle, however, it is further required of a suitable surface-active agent that, for instance, the surfactant be non-deleterious to the plants to be treated, that it leave little or no visible deposit on the vegetation which remains to harvest and, just as important, that it be economical, for example, that it be an effective emulsifier when present in very small concentrations in the aqueous compositions.

It has been found that the polymeric ester horticultural chemicals of the present invention form stable emulsions in water and will leave little or no visible deposit on plant life to which they are applied. Further, the aqueous emulsions of the present invention have the advantage of being stable and applicable under conditions of neutral pH.

The horticulturally-active material is present in an amount sufficient to ensure plant health or the desired activity. The composition can contain, for example, about 0.5 to 20 weight percent of the horticulturally-active compound, preferably about 2 to 10 weight percent.

The horticulturally-active polymeric ester can be made by the esterification of a styrene-maleic anhydride copolymer with both an alkanol containing about 8 to 24 carbon atoms, preferably about 10 to 18 carbon atoms, and a lower alkoxy, e.g., 1 to 4 carbon atoms, polyethylene glycol of an average molecular weight of about 200 to 750, preferably about 300 to 500. The lower alkoxy polyethylene glycol is preferably a methoxy polyethylene glycol. The alkanol and glycol are reacted in proportions such as to provide an alkanol to glycol mole ratio of from about 0.4/1 to 1.5/1, preferably about 1/1. The polymer has ester groups from both the lower alkoxy polyethylene glycol and the alkanol on the same polymer molecules. The ester is thus distinct from a mixture of the corresponding polymers each being esterified with only one of the aforesaid glycol and alkanol. The polymer can be esterified with a mixture of the alcohol and lower alkoxy polyethylene glycol or it can be esterified sequentially with either the alcohol or glycol followed by esterification with the other. In either case, it is important that the polymer be esterified with both groups, i.e., that the ester polymer contains both the alcohol and glycol groups and not a mixture of ester polymers which are separately and singly esterified with either the alcohol or glycol.

Preparation of the styrene-maleic anhydride polymer component of the surfactant of the present invention may be by known methods: for example, it can be made in accordance with the teachings of U.S. Pat. 3,342,787, issued Sept. 19, 1967. Thus, styrene and maleic anhydride can be first polymerized, for instance, by solution polymerization where the monomers are polymerized in a suitable solvent employing as a polymerization catalyst a free-radical catalyst, such as a peroxide, preferably benzoyl peroxide, dicumyl peroxide or an alkyl peroxy dicarbonate, at a temperature of about 75 to 300° C., or more. Suitable solvents include the aromatic hydrocarbon solvents, such as cumene, p-cymene, xylene, toluene, etc. Other suitable solvents are the ketones, such as methylethyl ketone. A preferred manner of carrying out the polymerization is by what is known as incremental feed addition. By this method, the monomers and catalyst are first dissolved in a portion of the solvent in which the polymerization is to be conducted and the resulting solution fed in increments into a reactor containing solvented heated to reaction temperature, usually the reflux temperature of the mixture.

When an aromatic solvent is employed as the solvent for the polymerization the formation of the copolymer causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation. The polymer contains a molar ratio of styrene to maleic anhydride of from about 1:1 to about 4:1 and has an average molecular weight, prior to esterification of about 600 to 5,000, preferably about 800 to about 2500.

The esterification product of the present invention can be formed by esterifying the styrene-maleic anhydride polymer with a lower alkoxy polyethylene glycol, preferably methoxy polyethylene glycol, of an average molecular weight of about 200 to 750, preferably about 300 to 500, in the presence of an alcohol containing 8 to 24 carbon atoms, preferably about 10 to 18 carbon atoms. The esterification can be carried out at any convenient temperatures, e.g., about 100° C., preferably about 140° to 190° C. Although no catalyst is necessary, the esterification can be carried out in the presence of a catalytic amount of, for instance, a fatty acid metal salt, preferably an alkali metal salt. The alcohol and glycol can be present, as noted above, in a mole ratio of about from 0.4:1 to 1.5:1, preferably about 1:1. A preferred product is prepared by the reaction of one anhydride equivalent weight of a 1:1 styrene-maleic anhydride copolymer (average molecular weight of about 1500), 0.5 mole of methoxy polyethylene glycol (average molecular weight of about 550) and 0.5 mole of stearyl alcohol (1-octadencanol). The polymer is about 4 to 150 percent, preferably about 40 to 120 percent, half-esterified with the total methoxy polyethylene glycol and alkanol.

This polymeric ester horticultural chemical can be mixed with water in an amount sufficient to yield an aqueous emulsion of the desired concentration of the horticultural chemical, for example, the horticultural chemical is added to water in an amount sufficient to yield a stable product containing a sufficient concentration of horticultural chemical to ensure plant health, or the desired activity, which can be, for example, as noted above, from about 0.5 to 20 weight percent, preferably about 2 to 10 weight percent, of the product.

Tobacco plants are customarily "topped" at predetermined stages of growth, i.e., the main leader or terminal bud of the plant is broken and removed when it begins to flower in order to redirect the plant's energies to the growth of its leaves. An attendant result of topping however, is the promotion of rapid growth of secondary buds, known as "suckers," which form at the points where the leaf steams join the plant. Sucker growth saps the plant of energy and creates undesirable shade over portions of the plant; the result, if suckers are allowed to grow undisturbed, is a substantial lessening in the overall size and quality of the tobacco leaves. The mechanical tobacco pickers presently available are also much more efficient when sucker growth is minimal. To combat sucker growth, the axillary buds are either manually removed or treated with a desuckering agent which retards their regrowth. Chemicals which have been employed as desuckering agents include, for example, petroleum mineral oils, e.g., naphthenic base oils, hydroxymethyl and aminomethyl derivatives of maleic hydrazide and their salts; phosphonium halides; halo-carbanilic acid esters, secondary and tertiary amine salts; vegetable oils, lower alkyl esters of $C_6$ to $C_{20}$ carbon atoms; and primary alkanols of $C_6$ to $C_{24}$ carbon atoms. Many of these agents are substantially water-insoluble and required the presence of a surfactant to provide a suitable aqueous emulsion. The alcohol-glycol esterified polymer of the present invention performs exceptionally well as a tobacco desuckering agent. The emulsions may be prepared and applied at a pH of about 7 to 10 and there is usually no visible residue remaining on the plants after treatment. The alcohols are also useful to chemically top tobacco plants, such as Maryland tobacco, and can be applied to the plant in the button stage.

The invention will be further described by the following examples.

EXAMPLE I 61.2 grams (0.20 mole) of a copolymer of styrene and maleic anhydride of a molecular weight of about 1650 and having a mole ratio of styrene to maleic anhydride of 2:1, 66.2 grams (0.189 mole) of a methoxy polyethylene glycol of an average molecular weight of about 350, 35.1 grams (0.189 mole) of normal dodecyl alcohol, 393.0 grams of xylene as a solvent and 1 milliliter of phosphoric acid were placed in a 1000 ml. 3-necked, fluted round bottom flask equipped with a stirrer, Dean-Stark trap and condenser. The reaction mixture was stirred until the boiling point of the xylene was reached. Stirring was discontinued at this point due to foaming. The mixture was refluxed for 9 hours. When the reflux period was completed the xylene was distilled from the reaction mixture. The maximum temperature of the pot was 170° C. The remaining xylene was stripped off under reduced pressure at a temperature below 170° C. The product isolated had an acid number of 85.1 mg. KOH/g.

EXAMPLE II 306 grams (1.0 mole) of the styrene-maleic anhydride copolymer of Example I, 222 grams (0.635 mole) of a methoxy polyethylene glycol of an average molecular weight of about 350, 235 grams (1.26 moles) of normal dodecyl alcohol and 6 grams of p-toluenesulfonic acid were placed in a resin kettle equipped with a stirrer, Dean-Stark trap and condenser. The reaction mixture was heated to 200° C.–220° C., for 1 hour and 50 minutes (until water stopped coming off). The reactants were stirred during the heating period and nitrogen was passed through the system. The product was a sticky viscous mass at room temperature. The product has an acid number of 40.1.

EXAMPLE III 202 grams (1 mole) of a copolymer of styrene and maleic anhydride of a molecular weight of about 1450, and having a mole ratio of styrene to maleic anhydride of 1:1, 294 grams (0.84 mole) of a methoxy polyethylene glycol of an average molecular weight of about 350, and 156 grams (0.84 mole) of normal dodecyl alcohol were placed in a 1000 ml. resin kettle equipped with a stirrer, Dean-Stark trap and condenser. The mixture was heated at 200–225° C. until the evolution of water stopped after 2 hours and 40 minutes. Nitrogen was passed through the system during the heating period. The product had an acid number of 61.3.

EXAMPLE IV 202 grams (1.0 mole) of the styrene-maleic anhydride copolymer of Example III, 420 grams (1.2 moles) of a methoxy polyethylene glycol of an average molecular weight of about 350, and 113 grams (0.61 mole) of n-dodecyl alcohol were placed in a resin kettle equipped with a stirrer, Dean-Stark trap and condenser. The reaction mixture was heated for 2 hours at 200–220° C. Water had stopped coming over at the end of 2 hours of heating. The product had an acid number of 65.1.

EXAMPLE V

A mixture of 61.2 grams of the styrene-maleic anhydride copolymer of Example I, 37.2 grams of n-decyl alcohol, 70.0 grams of methoxy polyethylene glycol of an average molecular weight of 550 and 400 grams of xylene as a solvent was placed in a three-neck flask equipped with a stirrer, Dean-Stark trap and condenser. The mixture was agitated and refluxed for eight and one-half hours. At the end of the heating period, the xylene was distilled until the pot temperature reached 160° C. The remaining xylene was removed under reduced pressure and the pot temperature was not allowed to exceed 160° C. The acid number of the product was 76.6. The product was soluble in acetone and n-decyl alcohol.

This esterification product was tested alone in an aqueous solution (pH 7.2) in comparison with commercial tobacco chemicals on the leaf axils of Nicotian, a talacum CV type of flue-cured tobacco at the time of topping. Anatomical effects were sufficiently determined. The commercial tobacco chemicals used were "Penar" (dimethyldodecylamine) and "MH–30" (diethanol amine salt of maleic hydrazide). The Penar was used as a concentration of 5 quarts per acre of tobacco. There were 8300 plants per acre. The 5 quarts of Penar were mixed with 120 gallons of water before spraying on the plants. The Penar used was approximately 50 percent solution of dimethyldodecylamine in isopropyl alcohol. The MH–30 was used as a concentration of 4 quarts of MH–30 per acre of tobacco. Twenty-five gallons of water were used. The number of plants of tobacco per acre was again 8300. The concentrations and procedure used were as found in the directions for use with the Penar and MH–30 products.

The esterification product was dissolved in water to produce a concentration of 5 weight percent. The solution was sprayed at the rate of 20 ml. per plant with direction to the several leaf axils. Tissues destroyed after two hours included the suckers and adjoining petiole. The plants had been topped.

Table I shows the results obtained. The flue-cured CV type tobacco is considered to be the most difficult to control in respect to sucker growth. The composition of this invention gave a 92% control which was greater than that achieved with the commercial products.

TABLE I

| Material | Leaf damage | Percent sucker control |
|---|---|---|
| Esterification product | None | 92 |
| Penar | Slight | 78 |
| MH-30 | do | 89 |

As shown above, the esterification product solution of this invention produces a significant control in tobacco suckering. The product is also useful in the horticultural regulation of other products such as flowers, corn, tomatoes, potatoes, and other crops.

We claim:

1. A method of desuckering tobacco plants by applying to said plants an aqueous solution containing an amount sufficient to desucker of a horticulturally-active styrene-maleic anhydride copolymer ester wherein the polymer has a molar ratio of styrene to maleic anhydride of about 1:1 to 4:1 and an unesterified molecule weight of about 600 to 5000, esterified with both of (A) and alkanol containing about 8 to 24 carbon atoms, and (B) a lower alkoxy polyethylene glycol wherein the alkoxy group contains 1 to 4 carbon atoms, and having an average molecular weight of about 200 to 750, (A) and (B) being in a mole ratio of from about 0.4 to 1.5 to 1 and wherein about 4 to 150% of the total number of carboxyl carbon atoms of the polymer are half-esterified with (A) and (B).

2. The method of claim 1 wherein about 40 to 120% of the total number of carboxyl carbon atoms of the polymer are half-esterified with (A) and (B).

3. The method of claim 1 wherein the (A) alcohol contains 10 to 18 carbon atoms.

4. The method of claim 3 wherein the lower alkoxy polyethylene glycol is methoxy polyethylene glycol.

5. The method of claim 1 wherein the styrene-maleic anhydride copolymer has a molar ratio of polymerized styrene to polymerized maleic anhydride of about 1:1 and an average molecular weight, prior to esterification of about 800 to 2500.

6. The method of claim 1 wherein the mole ratio of (A) to (B) is about 1:1.

7. The method of claim 1 wherein the solution contains from about 0.5 to 20 weight percent of the horticulturally-active styrene-maleic anhydride copolymer ester.

8. The method of claim 7 wherein the solution contains from about 2 to 10 weight percent of the horticulturally-active styrene-maleic anhydride copolymer ester.

9. The method of claim 1 wherein the solution is applied to additionally chemically top said tobacco plants.

References Cited
UNITED STATES PATENTS 3,556,763   1/1971   Gower et al. _____ 71—78 X JAMES O. THOMAS, JR., Primary Examiner U.S. Cl. X.R.

71—92